United States Patent [19]
Egglhuber

[11] Patent Number: 6,073,878
[45] Date of Patent: Jun. 13, 2000

[54] METHOD AND DEVICE FOR UNWINDING OR WINDING UP A SAWING WIRE

[75] Inventor: Karl Egglhuber, Hebertsfelden, Germany

[73] Assignee: Wacker Siltronic Gesellschaft für Halbleitermaterialien AG, Burghausen, Germany

[21] Appl. No.: 09/086,852

[22] Filed: May 29, 1998

[30] Foreign Application Priority Data

Jun. 5, 1997 [DE] Germany ............................ 197 23 630

[51] Int. Cl.[7] ........................... B65H 54/28; B65H 27/00; B65H 57/00; B65H 75/18
[52] U.S. Cl. ................... 242/478.2; 242/484; 242/397.2; 242/397.5; 242/615.2; 242/157.1; 242/596.3; 242/599.2
[58] Field of Search .............................. 242/399.1, 484, 242/484.1, 478.2, 397.2, 397.5, 615.2, 157.1, 596.3, 599.2

[56] References Cited

U.S. PATENT DOCUMENTS

| | | | |
|---|---|---|---|
| 1,140,924 | 5/1915 | Underhill | 242/478.2 |
| 3,544,035 | 12/1970 | Woolever | 242/478.2 |
| 4,022,391 | 5/1977 | Stein et al. | 242/478.2 |
| 4,422,590 | 12/1983 | Rathbone | 242/599.2 |
| 5,564,637 | 10/1996 | Berthold et al. | 242/484.1 |
| 5,839,514 | 11/1998 | Gipson | 242/399.1 |

FOREIGN PATENT DOCUMENTS 4-135158  5/1992  Japan .

OTHER PUBLICATIONS

English Abstract corresponding to JP 4–135158.

*Primary Examiner*—John Q. Nguyen
*Attorney, Agent, or Firm*—Collard & Roe, P.C.

[57] ABSTRACT

A device and method for unwinding or winding a sawing wire from a reel or onto a reel which rotates. The sawing wire runs from the reel or toward the reel over a pulley and in so doing, assumes a defined axial position on the reel. In the method, the reel is moved along its rotational shaft while the sawing wire is unwound or wound up. The sawing wire however remains aligned perpendicular to the rotational shaft of the reel in the region between the reel and the pulley. There is a pivot arm which is moved concomitantly by a carriage system. The pivot arm has an end piece connected to one of the clamping elements. Thus it is possible to move the pivot arm from a reel-holding position into a reel-release position.

7 Claims, 3 Drawing Sheets

METHOD AND DEVICE FOR UNWINDING OR WINDING UP A SAWING WIRE

BACKGROUND OF THE INVENTION

1. Field of the Invention

The present invention relates to a method and a device for unwinding a sawing wire from a reel or winding a sawing wire onto a reel, in which the reel rotates and the sawing wire runs from the reel or toward the reel via a pulley.

2. The Prior Art

Devices of this type are used in wire saws, in particular in wire saws for cutting wafers of semiconductor crystals. These wire saws have a cutting head with two or more wire-guide rollers, around which a sawing wire is wound. Between adjacent wire-guide rollers, the sawing wire forms a wire web, which in conjunction with a sawing suspension can be used as a cutting tool. If a sawing wire is used which is coated with a bonded abrasive grain, then no sawing suspension is needed.

During the cutting operation, the sawing wire runs from a stock reel, via a system of pulleys, to the wire-guide rollers, and from there, via a system of pulleys, back to a take up reel. The stock reel and the take up reel have to be dimensioned in such a way that they are able to hold a sawing wire with a length of several hundred kilometers. Such enormous wire lengths are necessary in order to divide large-diameter crystals into wafers. In the take-up state, the reels have a correspondingly high weight.

As a rule, the length of the sawing wire employed needs to be increased, wherever the diameter of the crystal to be cut is increased. It is sometimes necessary to cut crystals of particularly large diameters, for example silicon single crystals with diameters of 200 mm and greater. In this situation, the wire saw can be operated with an oscillating direction of rotation of the wire-guide rollers (oscillating operation). In this type of operation, some of the sawing wire which has previously been unwound from the stock reel is wound back onto the stock reel. This occurs after the direction of rotation of the wire-guide rollers has been reversed, and this operation is repeated periodically. In this way it is possible to operate for a longer period using the stock of wire available than would be possible when using the wire saw with a constant direction of rotation. It is advantageous if the reel body of the stock and take up reel is designed to be as long as possible and to have a diameter which is as small as possible. The moments of inertia which arise during the change in the direction of rotation are lower than with reels that are shorter and have larger diameters.

In the prior art, it is the travelling pulley which is moved toward the take up reel parallel to the reel axis in accordance with a predetermined program. This ensures that the wire windings are arranged along the reel axis in the order in which these wire windings are produced. When unwinding from the take up reel during the oscillating operation, the travelling pulley is moved in precisely the reverse sequence.

When winding the sawing wire onto the stock reel during the oscillating operation, the sawing wire windings produced are distributed on the reel in accordance with a predetermined program. This is carried out with the aid of the travelling pulley over which the sawing wire runs before it is wound onto the stock reel. This travelling pulley is moved parallel to the reel axis in accordance with the program specification.

A drawback of this unwinding and winding-up method is that the sawing wire is deflected laterally by the movement of the travelling pulley. This is because the other rollers of the pulley system do not follow the movement of the travelling pulley. The deflection of the sawing wire causes accelerated wear to the affected pulleys. This phenomenon is particularly accentuated when reels are used with an elongated reel body. Moreover, in this method it is necessary to regulate the rotational speed of the reel in a complex manner in order to achieve a uniform pretensioning of the sawing wire. When the travelling pulley is moved parallel to the reel axis, the length of wire between this travelling pulley and the immobile pulleys changes constantly. Hence there is a change in the pretensioning of the sawing wire.

There is also a further drawback in connection with unwinding or winding the sawing wire from or onto a reel. The associated reel mounting and removal were previously carried out largely by hand, and were complex due to the heavy weight of wound reels.

SUMMARY OF THE INVENTION

It is an object of the present invention therefore to overcome the above-mentioned drawbacks and to simplify the winding and unwinding of a sawing wire onto or from a reel.

The object is achieved according to the present invention by providing a method for unwinding or winding a sawing wire from a reel or onto a reel, in which the reel rotates and the sawing wire runs from the reel or toward the reel via a pulley, and thus assumes a defined axial position on the reel. The reel is then moved along its rotational shaft while the sawing wire is being unwound or wound up, in such a manner that the sawing wire remains aligned perpendicular to the rotational shaft of the reel in the region between the reel and the pulley It is actually more advantageous, when unwinding or winding up the reel, to move the significantly heavier reel along its rotational shaft, rather than to move the travelling pulley. The method avoids lateral deflection of the sawing wire and the consequent need to accept increased wear to pulleys. It is considerably easier to regulate the reel rotational speed in order to maintain the pretensioning of the sawing wire. This is because there is no movement of the travelling pulley affecting the wire length.

The present invention furthermore relates to a device for unwinding or winding a sawing wire from or onto a rotating reel, having a pulley, over which the sawing wire runs from the reel or toward the reel, adopting a defined axial position on the reel, and also having a) a clamping system with two clamping elements, between which the reel is centered and clamped;

b) a carriage system, which moves the reel along its rotational shaft during the unwinding or winding of the sawing wire; and, c) a computer which controls the movement of the carriage system.

The device ensures that it is easy to perform the method and the associated mounting and removal of the reel, particularly taking into account the weight of the reels.

BRIEF DESCRIPTION OF THE DRAWINGS

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

In the drawings, wherein similar reference characters denote similar elements through the several views.

DETAILED DESCRIPTION OF PREFERRED EMBODIMENTS

Figure 1:
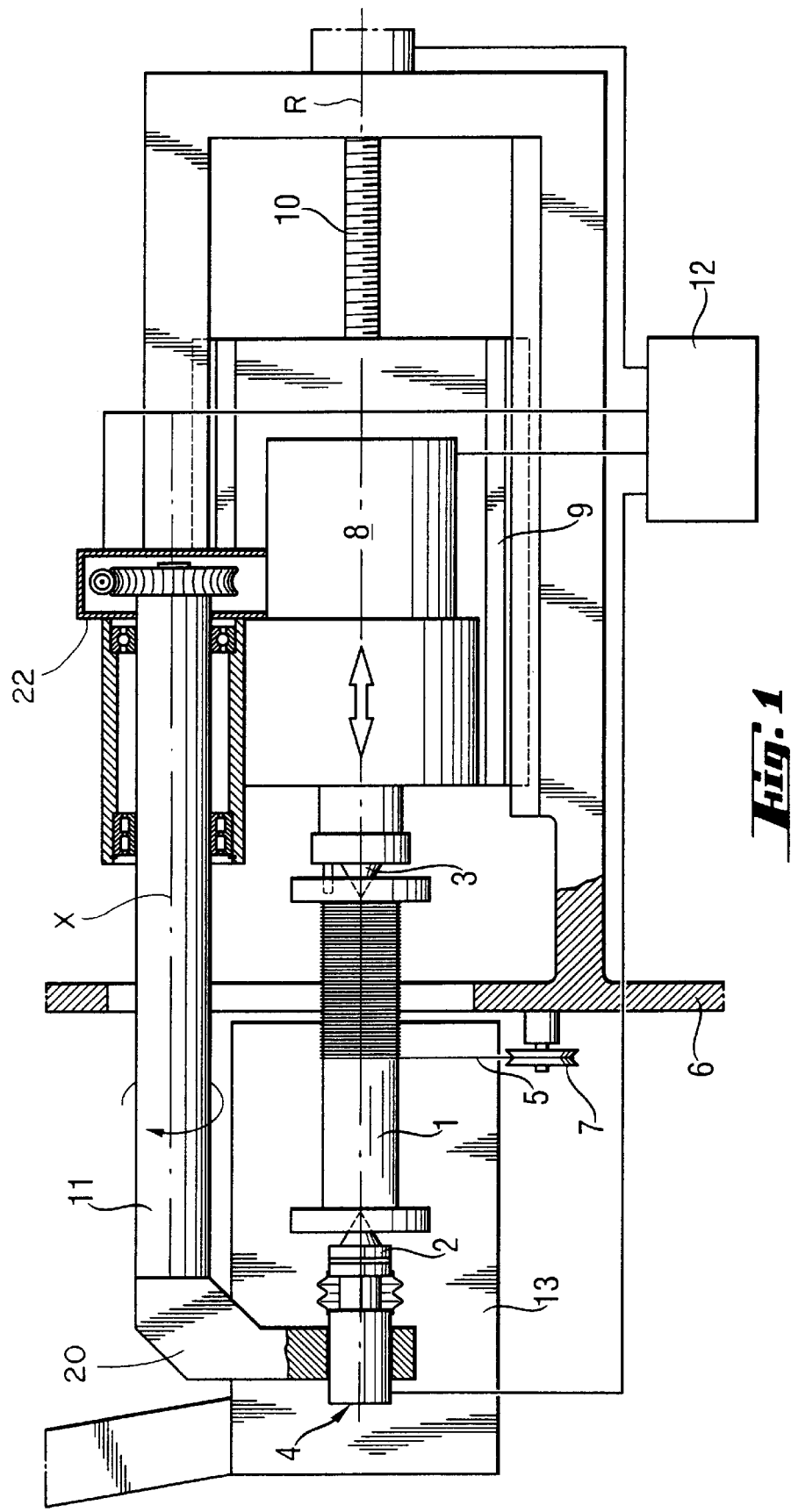
FIG. 1 is a diagrammatic partial cross sectional view of a preferred embodiment of the device according to the invention.

Turning now in detail to the drawings, FIG. 1 shows a reel 1 that is centered and clamped between two clamping elements 2 and 3 of a clamping system 4. The clamping system can preferably be actuated pneumatically, hydraulically, magnetically or electrically. A sawing wire 5, which is unwound or wound up by rotation of the reel, is wound around the reel. During winding or unwinding, the sawing wire runs over a pulley 7 which is mounted at a fixed location on a machine frame 6. The rotational movement of the reel is made possible by a motor 8 which rests on a carriage system 9. The carriage system has a spindle drive 10, so that the reel can be displaced along its rotational shaft R. When the carriage system is moved, a connected pivot arm 11 is displaced with it. The pivot arm has an angled end piece 20 which supports clamping element 2 of clamping system 4. It can be pivoted by pivot means 22 about an axis X which situated parallel to the rotational shaft of the reel. The movements of the reel, the carriage system and the pivot arm are preferably controlled by a computer 12.

To remove the reel, the carriage system is displaced into an outer position. The clamping element 2 is then withdrawn with the aid of the clamping system 4. The reel end, held by the clamping element becomes detached and falls onto a rest surface 13, arranged below the reel, of an optionally displaceable bench. Then, the pivot arm 11 is pivoted out of a reel-holding position, through approximately 90°, into a reel-release position. The carriage system 9 is then displaced backward out of the outer position. The rest surface of the bench is preferably configured so that the reel end resting on it is retained when the reel is displaced. The reel end which is still held by clamping element 3 is pulled down off clamping element 3 by the displacement of the carriage system, and falls onto the waiting bench.

A reel is mounted in a correspondingly reversed order to the removal of the reel. It is possible, if appropriate, to employ manipulators (not shown) which facilitate inserting the reel ends into the clamping elements.

When winding the pretensioned sawing wire onto the reel, large scale forces are created which are directed toward the rotational shaft of the reel. These forces reduce the internal diameter of the reel, and increase its axial length. This makes it more difficult to center the reel.

Figure 2:
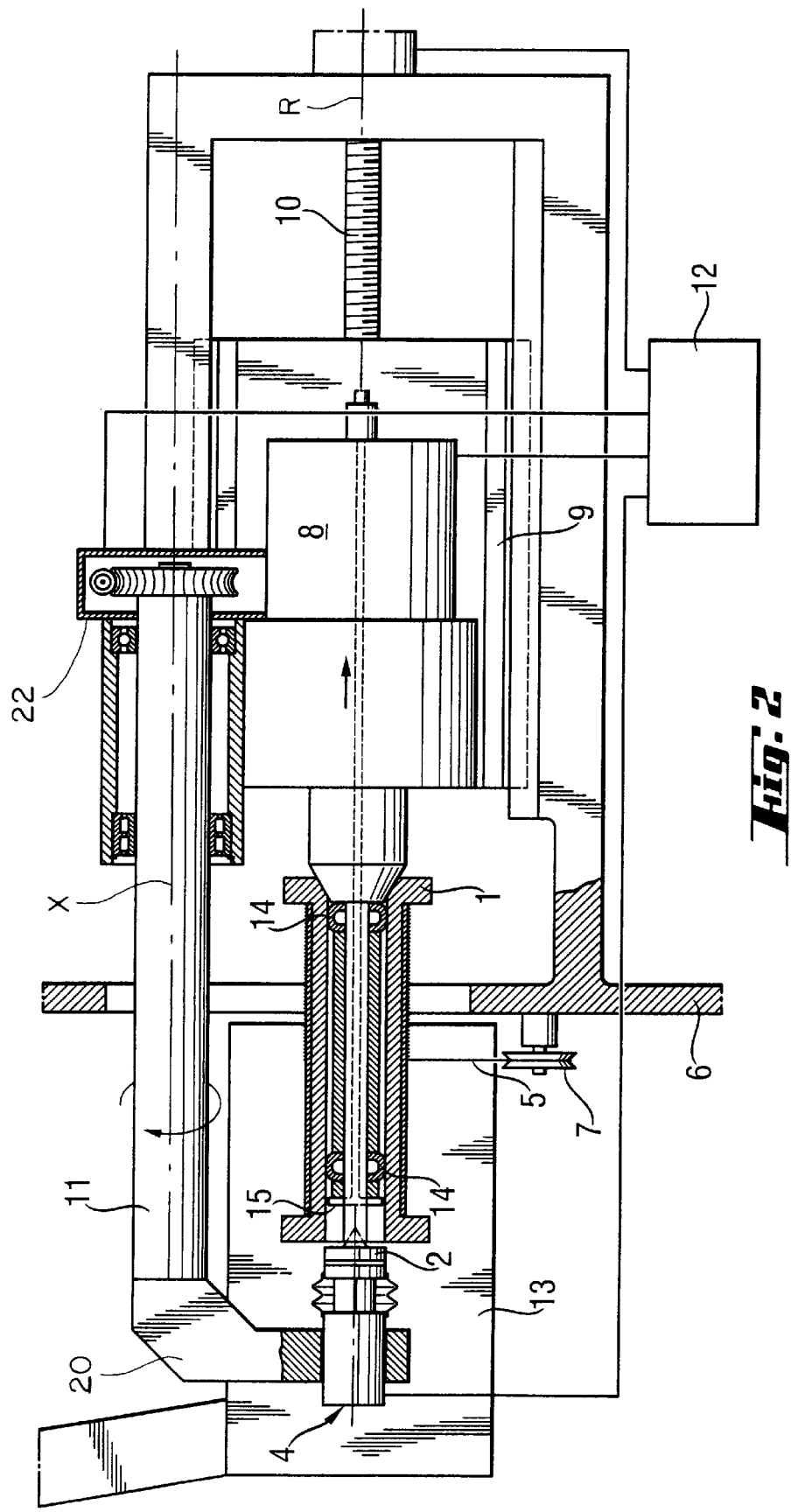
FIG. 2 shows the device in accordance with FIG. 1 with a reel of preferred design; and, FIG. 3 shows a device in accordance with FIG. 1, with a sensor device which is to be employed when unwinding the sawing wire.

Referring to FIG. 2, there is shown a particularly preferred embodiment of the invention using a reel which is easy to center. Elastically deformable rings 14, which surround the rotational shaft of the reel, are arranged inside the reel. The rings are axially compressed by a pressure piston 15, during which process they are deformed so that the reel remains precisely centered under the forces emanating from the sawing wire.

During the unwinding or winding operation, the sawing wire should remain aligned perpendicular to the rotational shaft of the reel in the region between the reel and the pulley. In this regard, the reel is moved along its rotational shaft with the aid of the carriage system. This movement changes the axial position of the sawing wire on the reel, while the sawing wire runs from or toward the reel.

When winding the sawing wire onto a reel which is used as a take up reel, the wire windings are preferably arranged next to one another and in layers, one above the other on the reel. This requires an axial movement of the reel which periodically changes direction. When the sawing wire is being wound up, it is preferable for the reel to move in a reciprocating manner along its rotational shaft as a function of a program stored in the computer. When unwinding the sawing wire from the take up reel, the reel is moved in a reverse manner with respect to the movement when winding up the wire. The movement sequence of the reel during winding can be stored in the computer and used to control the reel movement during unwinding.

When unwinding a reel used as a stock reel, it is not always known precisely how the axial position of the sawing wire running off the reel will change. The axial movement executed by the sawing wire when unwinding results from the arrangement of the sawing wire on the stock reel. Thus a sensor device is provided which registers a movement of the sawing wire relative to the rotational shaft of the reel and brings about an axial countermovement of the stock reel.

Figure 3:
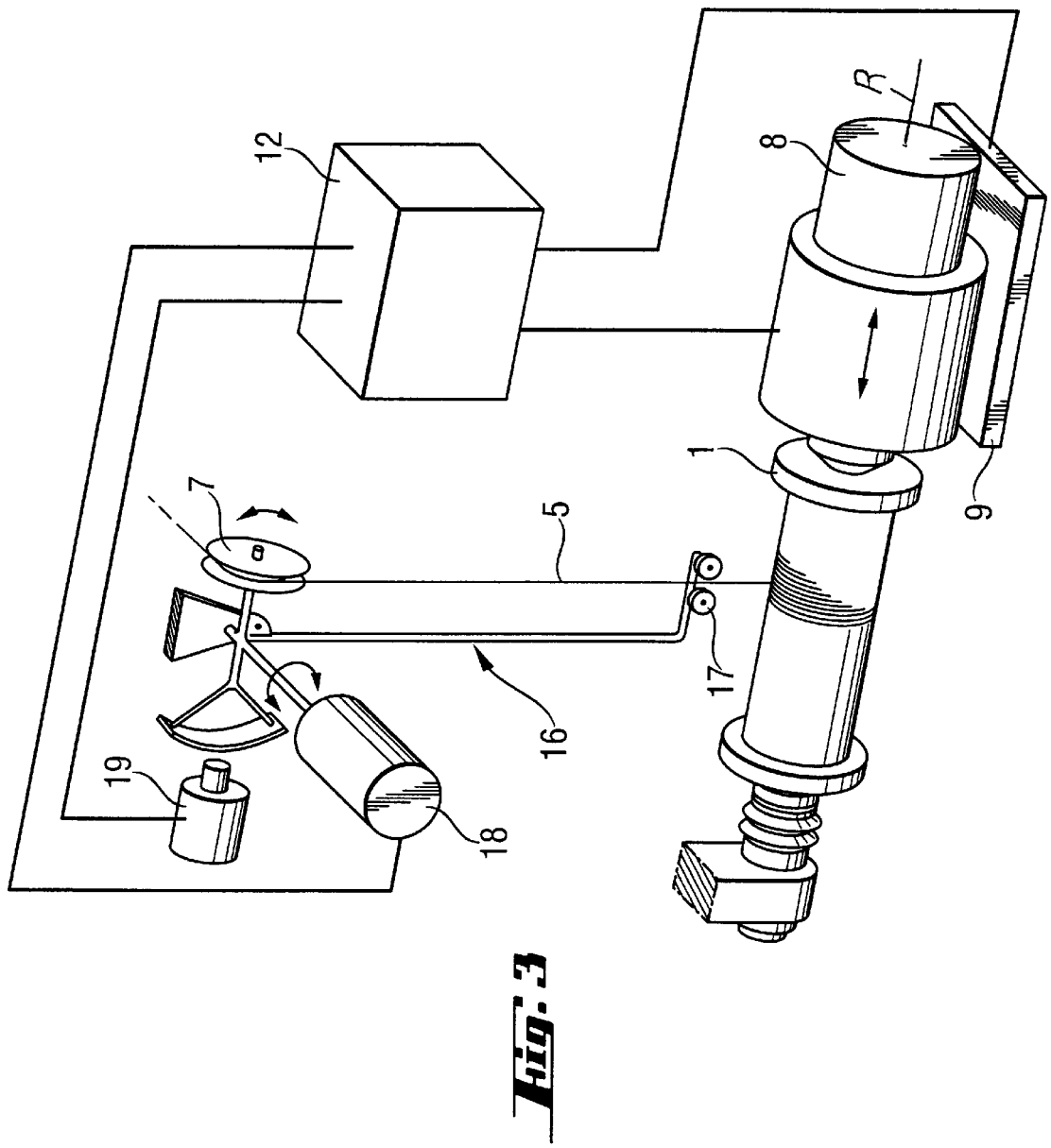

FIG. 3 illustrates a preferred sensor device 16. It comprises a sensor 17, which registers axial movements of the sawing wire 5 and is connected to a position transmitter 18. Upon detecting a change in the axial position of sawing wire 5, the position transmitter transmits a signal to computer 12. With the aid of the signal, the computer controls the axial movement of reel 1 so that the sawing wire remains aligned perpendicular to the rotational shaft of the reel. Sensor 17 illustrated is deflected by the axial movement of sawing wire 5 itself. The pivoting movement of the sensor can be automatically blocked by means of a locking device 19 which is connected to computer 12. According to a particularly preferred embodiment, pulley 7 is coupled to sensor 17. In the event of a deflection of the sensor, roller 7 executes a pivoting movement corresponding to the axial movement of the sawing wire. This avoids an increased load on the diverter roller and prevents the pulley from prematurely wearing out.

When winding the sawing wire onto the stock reel, the sensor is automatically blocked and acts only as a sawing wire guide. The stock reel is moved axially in accordance with a specific program stored in the computer. In this case, the sawing wire remains aligned perpendicular to the rotational shaft of the stock reel in the region between the reel and the pulley.

While a few embodiments of the present invention have been shown and described, it is to be understood that many changes and modifications may be made thereunto without departing from the spirit and scope of the invention as defined in the appended claims.

What is claimed is:

1. A method for unwinding a sawing wire from a reel or winding a sawing wire onto said reel, said reel having a rotational shaft, comprising rotating the reel;

running said sawing wire from the reel or toward the reel over a pulley so that the sawing wire adopts a defined axial position on the reel;

moving the reel along said rotational shaft, rather than moving said pulley, and winding or unwinding the sawing wire so that the sawing wire remains aligned perpendicular to the rotational shaft of the reel in a region between the reel and the pulley, so as to avoid lateral deflection of the sawing wire;

providing a sensor for detecting a movement in the axial position of the sawing wire;

during unwinding of the sawing wire from the reel causing the sensor to execute a pivoting movement corresponding to the axial movement of the sawing wire; and during winding of the sawing wire onto the reel blocking a pivoting movement of the sensor.

2. The method as claimed in claim 1, comprising providing a sensor device during unwinding, registering a change in an axial position of the sawing wire running from the reel by using said sensor device; and moving the reel along said rotational shaft as a function of the change registered.

3. The method as claimed in claim 1, comprising storing a program in a computer; and moving said reel along said rotational shaft during the unwinding or winding as a function of said program stored in said computer.

4. A device for unwinding a sawing wire from a rotating reel or winding a sawing wire onto said rotating reel, said reel having a rotational shaft, and said sawing wire adopting a defined axial position on the reel, comprising (a) a pulley over which the sawing wire runs from the reel or toward the reel;

(b) a clamping system with first and second clamping elements, said first clamping element clamping a first end of the reel and said second clamping element clamping a second end of said reel so that said reel is centered and clamped;

(c) a carriage system for moving the reel along said rotational shaft during unwinding or winding of the sawing wire, rather than moving said pulley;

(d) a computer for controlling movement of the carriage system, so that the sawing wire remains aligned perpendicular to the rotational shaft of the reel in a region between the reel and the pulley, so as to avoid lateral deflection of the sawing wire;

(e) a sensor for detecting a movement in an axial position of the sawing wire;

(f) means for causing the sensor to execute a pivoting movement corresponding to the axial movement of the sawing wire during unwinding of the sawing wire; and (g) means for blocking a pivoting movement of the sensor during winding of the sawing wire onto the reel.

5. The device as claimed in claim 4, further comprising a pivot arm which is moved concomitantly by the carriage system, said pivot arm having an end piece connected to one of said clamping elements; and means for pivoting said pivot arm from a reel-holding position into a reel-release position.

6. The device as claimed in claim 4, further comprising two elastically deformable rings located in an interior of the reel and surrounding the rotational shaft of the reel to support the reel on the rotational shaft;

a pressure piston in said reel interior for axially compressing said two rings; and wherein a first ring is at a first end of the rotational shaft and a second ring is at a second end of the rotational shaft.

7. The device as claimed in claim 4, further comprising means for actuating the clamping system; and said means for actuating selected from the group consisting of pneumatic actuating means, hydraulic actuating means, magnetic actuating means and electrical actuating means.

* * * * *